US009734606B2

(12) United States Patent
Tojo et al.

(10) Patent No.: US 9,734,606 B2
(45) Date of Patent: *Aug. 15, 2017

(54) PROGRAM INFORMATION DISPLAY SYSTEM AND METHOD DISPLAYING PROGRAM STRUCTURE INFORMATION INCLUDING INTERVAL INFORMATION

(71) Applicant: Kabushiki Kaisha Toshiba, Minato-ku (JP)

(72) Inventors: Nobuaki Tojo, Tachikawa (JP);
Hidenori Matsuzaki, Fuchu (JP);
Akira Kuroda, Yokohama (JP);
Mayuko Koezuka, Ota-ku (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 9 days.

This patent is subject to a terminal disclaimer.

(21) Appl. No.: 14/333,656

(22) Filed: Jul. 17, 2014

(65) Prior Publication Data
US 2015/0022528 A1    Jan. 22, 2015

(30) Foreign Application Priority Data
Jul. 22, 2013    (JP) .................................. 2013-152141

(51) Int. Cl.
*G06T 11/20*    (2006.01)
*G06F 9/44*    (2006.01)
(Continued)

(52) U.S. Cl.
CPC ............. *G06T 11/206* (2013.01); *G06F 8/75* (2013.01); *G06F 11/3636* (2013.01); *G06F 8/34* (2013.01);
(Continued)

(58) Field of Classification Search
CPC .... G06F 11/3636; G06F 8/75; G06F 11/3604; G06F 11/3419; G06F 11/323; G06F 11/3664; G06F 8/34; G06T 11/206
(Continued)

(56) References Cited

U.S. PATENT DOCUMENTS 5,191,646 A * 3/1993 Naito ......................... G06F 8/71
714/E11.207
5,375,125 A * 12/1994 Oshima ................. G06F 11/323
714/38.13
(Continued)

FOREIGN PATENT DOCUMENTS

JP    03-240128    10/1991
JP    2013-097494    5/2013

OTHER PUBLICATIONS

Koji Taniguchi, et al., "Generating compact sequence diagram from execution traces", Computer Software, vol. 24, No. 3, 2007, pp. 153-169 with English abstract.
(Continued)

Primary Examiner — Jin-Cheng Wang
(74) Attorney, Agent, or Firm — Oblon, McClelland, Maier & Neustadt, L.L.P.

(57) ABSTRACT

In a system according to an embodiment, program structure information may include interval information. Each interval information may include source code position information indicating a successive region on a source code of a target program and parent-child information for specifying a parent-child relationship with respect to the interval information. The program structure information may include a reference interval without a parent. A processing unit may specify the number of parents existing between each interval information and the reference interval as a depth of each interval information from the reference interval, and create display information by arranging the interval information on
(Continued)

a coordinate system defined by a first axis representing depth from the reference interval and a second axis representing the parent-child relationship based on the depth from the reference and the parent-child information.

17 Claims, 12 Drawing Sheets

(51) Int. Cl.
  *G06F 11/32* (2006.01)
  *G06F 11/36* (2006.01)
  *G06F 11/34* (2006.01)
(52) U.S. Cl.
  CPC ........ *G06F 11/323* (2013.01); *G06F 11/3419* (2013.01); *G06F 11/3604* (2013.01); *G06F 11/3664* (2013.01)
(58) Field of Classification Search
  USPC .................................. 345/440; 717/123, 128
  See application file for complete search history.

(56) References Cited

U.S. PATENT DOCUMENTS

| | | | | |
|---|---|---|---|---|
| 5,751,288 A | * | 5/1998 | Oshima | G06F 11/323 |
| | | | | 714/E11.181 |
| 6,026,362 A | * | 2/2000 | Kim | G06F 11/3664 |
| | | | | 705/317 |
| 6,427,232 B1 | * | 7/2002 | Ku | G06F 9/4443 |
| | | | | 714/E11.209 |
| 6,487,713 B1 | * | 11/2002 | Cohen | G06F 8/34 |
| | | | | 717/105 |
| 6,934,935 B1 | * | 8/2005 | Bennett | G06F 11/323 |
| | | | | 714/E11.181 |
| 7,802,233 B2 | | 9/2010 | Weinert et al. | |
| 2003/0005404 A1 | * | 1/2003 | Bowyer | G06F 17/5045 |
| | | | | 716/104 |
| 2003/0145281 A1 | * | 7/2003 | Thames | G06F 8/73 |
| | | | | 715/205 |
| 2007/0256062 A1 | * | 11/2007 | Madden | G06F 8/75 |
| | | | | 717/141 |
| 2008/0178158 A1 | * | 7/2008 | Hong | G06F 11/3419 |
| | | | | 717/128 |
| 2011/0296388 A1 | * | 12/2011 | Rohde | G06F 11/3604 |
| | | | | 717/131 |
| 2012/0137273 A1 | | 5/2012 | Meijler et al. | |
| 2012/0159452 A1 | * | 6/2012 | DeLine | G06F 8/34 |
| | | | | 717/125 |
| 2014/0173559 A1 | * | 6/2014 | Tiwari | G06F 8/31 |
| | | | | 717/122 |
| 2015/0242207 A1 | * | 8/2015 | Kuroda | G06F 8/75 |
| | | | | 717/123 |

OTHER PUBLICATIONS

Yoshinori Ohashi, et al., "A Perspective Software Visualization Using the Organization Metrics" (w/English Machine Translation), Mar. 6, 2003, pp. 79-86.

* cited by examiner

FIG.4

| 1 | Position: hoge1.c 1-300 |
|---|---|
| 2 | Parent: none |
| 3 | Children: hoge1.c 1-100, hoge1.c 102-300 |
| 4 | Parameter1: name, hoge1.c |
| 5 | Parameter2: type, file |
| 6 | Parameter3: line, 300 |
| 7 | Parameter4: time, 1000 |

FIG.5

| 1 | Position: hoge2.c 1-350 |
|---|---|
| 2 | Parent: none |
| 3 | Children: hoge2.c 1-150, hoge2.c 152-250, hoge2.c 252-350 |
| 4 | Parameter1: name, hoge2.c |
| 5 | Parameter2: type, file |
| 6 | Parameter3: line, 350 |
| 7 | Parameter4: time, 9000 |

FIG.6

| 1 | Position: hoge1.c 1-100 |
|---|---|
| 2 | Parent: hoge1.c 1-300 |
| 3 | Children: hoge1.c 10-80 |
| 4 | Parameter1: name, main |
| 5 | Parameter2: type, function |
| 6 | Parameter3: line, 100 |
| 7 | Parameter4: time, 800 |

FIG.7

| 1 | Position: hoge1.c 102-300 |
|---|---|
| 2 | Parent: hoge1.c 1-300 |
| 3 | Children: none |
| 4 | Parameter1: name, funcA |
| 5 | Parameter2: type, function |
| 6 | Parameter3: line, 199 |
| 7 | Parameter4: time, 200 |

FIG.8

| 1 | Position: hoge2.c 1-160 |
|---|---|
| 2 | Parent: hoge2.c 1-350 |
| 3 | Children: hoge2.c 20-120, hoge2.c 121-150 |
| 4 | Parameter1: name, funcB |
| 5 | Parameter2: type, function |
| 6 | Parameter3: line, 160 |
| 7 | Parameter4: time, 2000 |

FIG.9

| 1 | Position: hoge2.c 162-250 |
|---|---|
| 2 | Parent: hoge2.c 1-350 |
| 3 | Children: none |
| 4 | Parameter1: name, funcC |
| 5 | Parameter2: type, function |
| 6 | Parameter3: line, 89 |
| 7 | Parameter4: time, 1000 |

FIG.10

| 1 | Position: hoge2.c 162-250 |
|---|---|
| 2 | Parent: hoge2.c 1-350 |
| 3 | Children: hoge2.c 260-350 |
| 4 | Parameter1: name, funcD |
| 5 | Parameter2: type, function |
| 6 | Parameter3: line, 99 |
| 7 | Parameter4: time, 6000 |

FIG.11

```
1  Position: hoge1.c 10-80
2  Parent: hoge1.c 1-100
3  Children: hoge1.c 15-30, hoge1.c 40-70
4  Parameter1: type, loop
5  Parameter2: line, 71
6  Parameter3: time, 700
```

FIG.12

```
1  Position: hoge1.c 15-30
2  Parent: hoge1.c 10-80
3  Children: none
4  Parameter1: type, condition
5  Parameter2: line, 16
6  Parameter3: time, 400
```

FIG.13

```
1  Position: hoge1.c 40-70
2  Parent: hoge1.c 10-80
3  Children: none
4  Parameter1: type, condition
5  Parameter2: line, 31
6  Parameter3: time, 200
```

FIG.14

| 1 | Position: hoge2.c 20-120 |
|---|---|
| 2 | Parent: hoge2.c 10-160 |
| 3 | Children: hoge2.c 50-100 |
| 4 | Parameter1: type, condition |
| 5 | Parameter2: line, 101 |
| 6 | Parameter3: time, 1600 |

FIG.15

| 1 | Position: hoge2.c 121-150 |
|---|---|
| 2 | Parent: hoge2.c 10-160 |
| 3 | Children: none |
| 4 | Parameter1: type, condition |
| 5 | Parameter2: line, 30 |
| 6 | Parameter3: time, 400 |

FIG.16

| 1 | Position: hoge2.c 260-320 |
|---|---|
| 2 | Parent: hoge2.c 252-350 |
| 3 | Children: none |
| 4 | Parameter1: type, loop |
| 5 | Parameter2: line, 61 |
| 6 | Parameter3: time, 5500 |

FIG.17

```
1  Position: hoge2.c 50-100
2  Parent: hoge2.c 20-120
3  Children: none
4  Parameter1: type, loop
5  Parameter2: line, 51
6  Parameter3: time, 1500
```

FIG.18

```
1  name: text
2  type: if name is none, text
```

FIG.19

| hoge1.c | main(201) | loop(211) | condition(221) |
| | | | condition(222) |
| | funcA(202) | | |
| hoge2.c | funcB(301) | condition(311) | loop(321) |
| | | condition(312) | |
| | funcC(302) | | |
| | funcD(303) | loop(313) | |

PROGRAM INFORMATION DISPLAY SYSTEM AND METHOD DISPLAYING PROGRAM STRUCTURE INFORMATION INCLUDING INTERVAL INFORMATION

CROSS-REFERENCE TO RELATED APPLICATION(S)

This application is based upon and claims the benefit of priority from the Japanese Patent Application No. 2013-152141, filed on Jul. 22, 2013; the entire contents of which are incorporated herein by reference.

FIELD

Embodiments described herein relate generally to a program information display system, a method of displaying program information and a computer-readable program product.

BACKGROUND

Recently there is a technique for displaying a hierarchical structure of calling relationships in execution of program by representing functions of program execution and calling relationships of methods using a time axis and an axis indicating called functions and methods. In this technique, information about which function and method are calling certain function and method and which function and method are called by the certain function are collected for every calling in program execution, and calling relationship is visualized based on the collected information.

Furthermore, there is a technique for analyzing information about program execution, compressing and abstracting the analyzed information and displaying the compressed and abstracted information as a sequence diagram. In this technique, by compressing redundant parts in the information, and not by directly displaying every calling information, it is possible to display a further simple and readable sequence diagram.

BRIEF DESCRIPTION OF THE DRAWINGS

FIG. 4 is an illustration showing an example of interval information about the whole source code shown in FIG. 2;

FIG. 5 is an illustration showing an example of interval information about the whole source code shown in FIG. 3;

FIG. 6 is an illustration showing an example of interval information of a second layer in the source code shown in FIG. 2;

FIG. 7 is an illustration showing an example of another interval information of the second layer in the source code shown in FIG. 2;

FIG. 8 is an illustration showing an example of interval information of a second layer in the source code shown in FIG. 3;

FIG. 9 is an illustration showing an example of another interval information of a second layer in the source code shown in FIG. 3;

FIG. 10 is an illustration showing an example of another interval information of a second layer in the source code shown in FIG. 3;

FIG. 11 is an illustration showing an example of interval information of a third layer in the source code shown in FIG. 2;

FIG. 12 is an illustration showing an example of interval information of a fourth layer in the source code shown in FIG. 2;

FIG. 13 is an illustration showing an example of another interval information of the fourth layer in the source code shown in FIG. 2;

FIG. 14 is an illustration showing an example of interval information of a third layer in the source code shown in FIG. 3;

FIG. 15 is an illustration showing an example of another interval information of the third layer in the source code shown in FIG. 3;

FIG. 16 is an illustration showing an example of another interval information of the third layer in the source code shown in FIG. 3;

FIG. 17 is an illustration showing an example of interval information of a fourth layer in the source code shown in FIG. 3;

FIG. 18 is an illustration showing an example of display method information according to the embodiment;

FIG. 19 is an illustration showing an example of a display method by a display unit according to the embodiment;

DETAILED DESCRIPTION

An exemplary embodiment of a program information display system, a method of displaying program information and a computer-readable program product will be explained below in detail with reference to the accompanying drawings.

Figure 1:
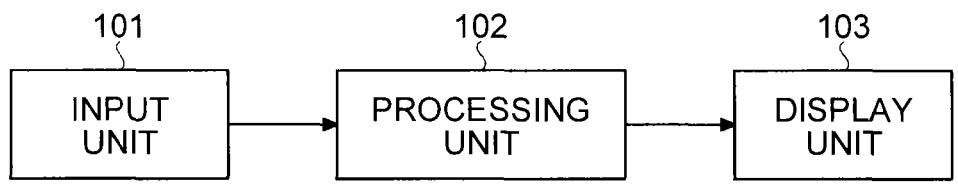
FIG. 1 is a block diagram showing an example of an outline configuration of a system according to an embodiment.

FIG. 1 is a functional block diagram showing an outline structure of a program information display system according to the embodiment. As shown in FIG. 1, the program information display system includes an input unit 101, a processing unit 102 and a display unit 103.

The input unit 101 inputs information about program structure (hereinafter referred to as program structure information) and information about display method (hereinafter referred to as display method information). The program structure information is information storing information about program for analysis target and includes information about one or more intervals. In the following, information about interval will be referred to as interval information. Accordingly, the interval information is a compilation of information about a successive region in a source code. The display method information is information about how display information about program included in the program structure information.

Figure 2:
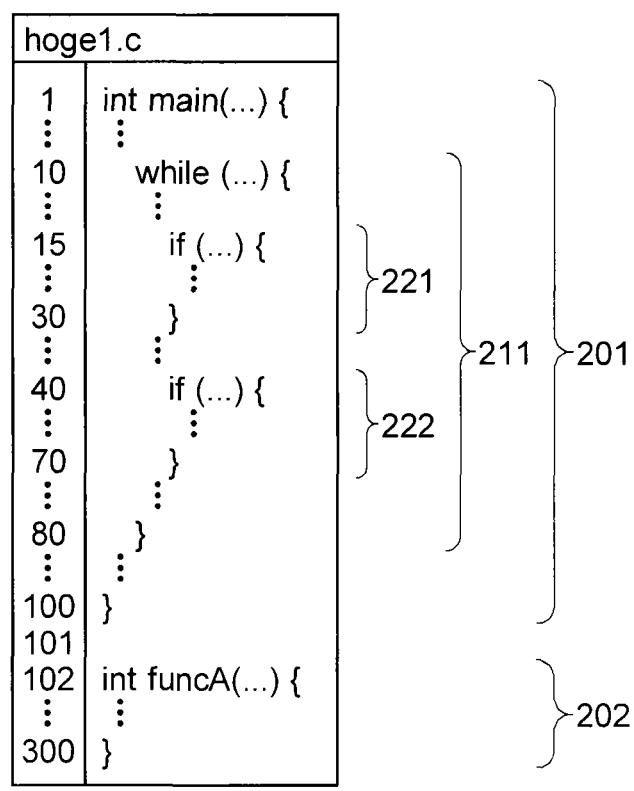
FIG. 2 is an illustration showing an example of a source code for display target in the embodiment.
Figure 3:
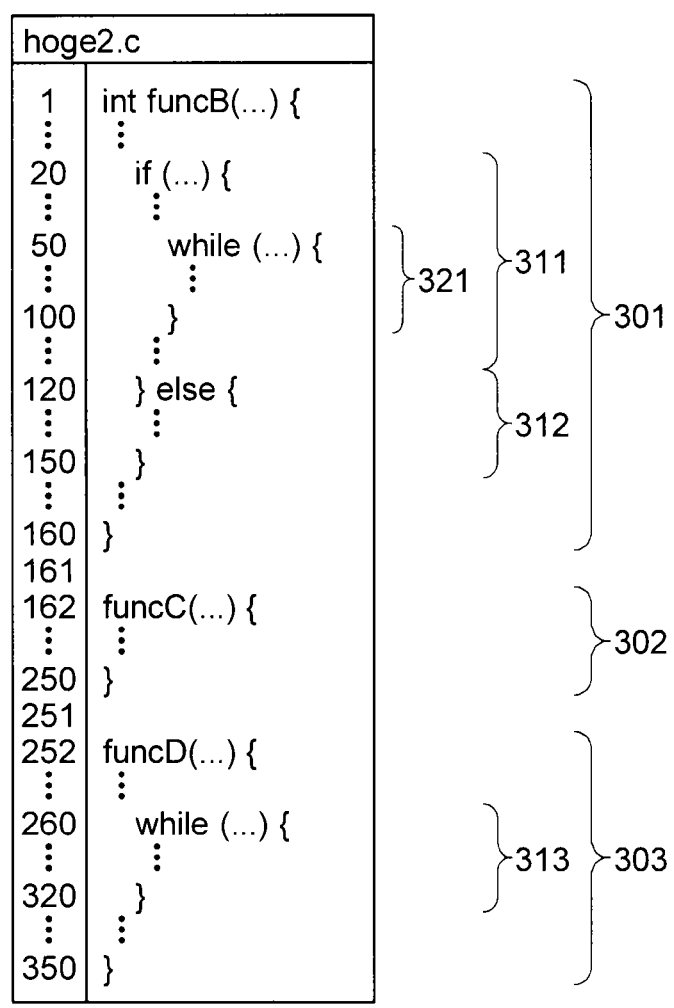
FIG. 3 is an illustration showing an example of another source code for display target in the embodiment.

In this description, a program being a source for constructing program structure information is a source code described in programming language such as C language, Java© language, or the like, for instance. In FIGS. 2 and 3, source codes of program being sources for constructing program structure information in the embodiment are shown.

Program exampled in this description is constructed from two files, one being a file (shown in FIG. 2) of which file name is "hoge1.c" and the other being a file of which file name is "hoge2.c". Numeric characters attached at left sides of the source codes in the files shown in FIGS. 2 and 3 indicate row numbers on the source codes, respectively. The row numbers are described for explanation of the embodiment, and actual source codes do not include the row numbers.

The source code of the file shown in FIG. 2 includes intervals 201 and 202. Intervals are successive regions which can be divided in the source code to be a single group. The interval 201 includes an interval 211, and the interval 211 includes intervals 221 and 222. Likewise, as shown in FIG. 3, the source code of the file shown in FIG. 3 includes intervals 301, 302, and 303. The interval 301 includes intervals 311 and 312, and the interval 311 further includes an interval 321. The interval 303 includes an interval 313. Each file shown in FIGS. 2 and 3 can be treated as a single interval.

As described above, the source codes of the files shown in FIGS. 2 and 3 are described so that one or more intervals are hierarchically arranged. In the following, it is defined that the files themselves shown in FIGS. 2 and 3 are first layers, the intervals 201, 202, 301, 302, and 303 are second layers, the intervals 211, 311, 312, and 313 are third layers, and the intervals 221, 222, and 321 are fourth layers. That is, a layer located at n-th (n is positive integer) from the source codes (first layers) shown in FIGS. 2 and 3 is referred to as an n-th layer. As described above, in the program structure information, each piece of interval information is made to correspond to a certain layer of the source code.

The interval information includes information about a position of an interval in a source code (hereinafter referred to as source code position information) (first information), information about parent-child relationship (hereinafter referred to as parent-child information) (second information), and information about feature amount (hereinafter referred to as feature information). The source code position information indicates where the interval indicated by the interval information is corresponded in the source code. The parent-child information indicates parent-child relationship between interval information. The feature information indicates information capable of being obtained from inside the interval indicated by the source code position information.

The parent-child relationship between interval information is information about relationship between layers. For example, when there are two pieces of interval information, if a region indicated by a source code position information included in first interval information includes a region indicated by a source code position information included in second interval information, the first interval information is defined as a parent of the second interval information and the second interval information is defined as a child of the first interval information. Likewise, for example, there are two pieces of interval information, if a region indicated by the source code position information included in the first interval information is included in a successive region indicated by a source code position information included in third interval information, the first interval information is defined as a child of the third interval information and the third interval information is defined as a parent of the first interval information.

The parent-child information is used for specifying such parent-child relationship (also referred to as inclusion relationship). The parent-child information includes information (third information) indicating whether interval information having parent-child relationship with certain interval information exists, includes information (fourth information and fifth information) for specifying the interval information having the parent-child relationship with the certain interval information. In the information for specifying interval information having parent-child relationship, when explaining using the example of the above-described two pieces of interval information, for instance, information (the fourth information) for specifying child interval information does not include interval information (fourth interval information) including a successive region indicated by a source code included in the successive region indicated by the source code included in the second interval information. Furthermore, information (the fifth information) for specifying parent interval information does not include interval information (fifth interval information) including the successive region indicated by the source code including the successive region indicated by the source code included in the third interval information.

To the information (third information) indicating whether interval information having parent-child relationship exists, it is possible to apply individual information, and also possible to apply a combination of the information (fourth and fifth information) for specifying the interval information with parent-child relationship and null data (or the like).

The feature information indicates an internal state which can be obtained at a specific timing during execution of an interval indicated by the source code position information, or a source code in the interval indicated by the source code position information and information which can be obtained by analyzing the source code in the interval indicated by the source code position information. The internal state may include execution time for executing the interval indicated by the source code, for instance. The information obtained by analyzing the source code in the interval indicated by the source code position information may include a row number of a source code in the region indicated by the source code position information, for instance.

FIGS. 4 to 17 shows examples of the pieces of interval information about the intervals (and the source codes) shown in FIGS. 2 and 3. FIG. 4 shows an example of the interval information of the whole file shown in FIG. 2. FIG. 5 shows an example of the interval information of the whole file shown in FIG. 3. FIG. 6 shows an example of the interval information 201 in the source code shown in FIG. 2. FIG. 7 shows an example of the interval information 202 in the source code shown in FIG. 2. FIG. 8 shows an example of the interval information 301 in the source code shown in FIG. 3. FIG. 9 shows an example of the interval information 302 in the source code shown in FIG. 3. FIG. 10 shows an example of the interval information 303 in the source code shown in FIG. 3. FIG. 11 shows an example of the interval information 211 in the source code shown in FIG. 2. FIG. 12 shows an example of the interval information 221 in the source code shown in FIG. 2. FIG. 13 shows an example of the interval information 222 in the source code shown in FIG. 2. FIG. 14 shows an example of the interval information 311 in the source code shown in FIG. 3. FIG. 15 shows an example of the interval information 312 in the source code shown in FIG. 3. FIG. 16 shows an example of the interval information 313 in the source code shown in FIG. 3. FIG. 17 shows an example of the interval information 321 in the source code shown in FIG. 3. In the examples shown in FIGS. 4 to 17, numeric characters attached at left sides indicate row numbers of each information. The row numbers are described for explanation of the embodiment, and will not be expressly described on actual information.

In the examples shown in FIGS. 4 to 17, a first line indicates a source code position information, a second line indicates information about parent (parent information) in parent-child information, a third line indicates information about child (child information) in parent-child information, and from a fourth line and beyond (for instance, fourth to seventh lines in FIGS. 4 to 10, and third to sixth lines in FIGS. 11 to 17), feature information is indicated.

When explaining in further detail using an example of the interval information corresponding to the whole file in FIG. 2 shown in FIG. 4, the source code position information in the first line indicates that an interval corresponding to the corresponding interval information (hereinafter referred to as corresponding interval) corresponds to first to three-hundredth lines (whole file) in the file of which name is "hoge1.c". The parent information in the second line indicates information of "none" which indicates that parent interval information is nothing. The child information in the third line indicates that two pieces of interval information of interval information corresponding to first to hundredth lines in the file "hoge1.c" and interval information corresponding to hundred-second to three-hundredth lines in the file "hoge1.c" are children. When referring intervals described in the file shown in FIG. 2, in the whole file (from first line to three-hundredth line) corresponding to FIG. 4, the interval 201 corresponding to the first to hundredth line and the interval 202 corresponding to the hundred-second line to three-hundredth line) exist. A second line indicating parent information of the interval information of FIG. 6 corresponding to the interval 201 indicates that the interval information corresponding to the first to three-hundredth lines in "hoge1.c" (i.e., the interval information of FIG. 4) is parent. The fourth line in the feature information from the fourth to seventh lines indicates "name" representing attribute information indicating a name of file or function and a file name "hoge1.c". The fifth line indicates "type" representing attribute information indicating a type of interval information and "file" indicating that the type thereof is file including the source code. The sixth line indicates "line" representing attribute information indicating how many lines of the source code the interval corresponding to the interval information corresponds to and that the number of lines thereof is 300. The seventh line indicates "time" representing attribute information indicating for how long the interval corresponding to the interval information is executed and that the execution time thereof is 1000 milliseconds.

When checking the file of FIG. 2 corresponding to the file name "hoge1.c", it can be found that the file of "hoge1.c" is constructed from three hundred lines, the whole file is made to correspond with the source code position information and that the number of lines is 300.

In the interval information shown in FIGS. 6 to 10, the fifth line indicates "function" representing that a type of the interval information is function on the source code. Furthermore, in the interval information shown in FIGS. 11, 16, and 17, the fourth line indicates "loop" representing that the type of the interval information is loop on the source. Moreover, in the interval information shown in FIGS. 12 to 15, the fourth line indicates "condition" representing that the type of the interval information is conditional branching on the source code.

As for the two types of interval information of which attribute information indicating a type of the interval information is "loop" and "condition" explicit names are not given, as can be seen from the files shown in FIGS. 2 and 3. Therefore, the feature information of "name" representing the name of the file or function, which is supposed to exist on the fourth line in the interval information shown in FIGS. 4 to 10, is omitted.

As described above, the program structure information targeted at the source codes shown in FIGS. 2 and 3 are constructed from the interval information shown in FIGS. 4 to 17. Therefore, by relating specific intervals on the files shown in FIGS. 2 and 3 to each feature information, it is possible to abstract detail information about feature amount while relating the detail information about the feature amount to the source codes of the files shown in FIGS. 2 and 3. As a result, it is possible to trace each interval on the source codes of the files of FIGS. 2 and 3 to know under what situation each interval is.

Furthermore, because each interval information has the parent-child relationship, it is possible to manage the parent-child relationships from the intervals on the lower layer to intervals on the upper layer, and thus, it is also possible to abstract information about the interval on the lower layer by information about the interval on the upper layer. For example, when displaying a structure with multiply-complicated loops, by displaying information about the interval on the lower layer together with the information about the most significant loop, it is possible to display the information more visible. Adversely, it is possible to refine the information about the interval on the upper layer by the information about the interval on the lower layer.

The display method information is information indicating how each feature information for each attribute of the feature information should be displayed. FIG. 18 shows an example of the display method information according to the embodiment. In the following explanation, a case where the program structure information constructed from the interval information shown in FIGS. 4 to 17 is displayed based on the display method information shown in FIG. 18 will be exampled.

As shown in FIG. 18, in the display method information, a first line indicates that feature amount with attribute information of "name" is displayed as plain text. A second line indicates that when interval information does not have feature amount with attribute information of "name", the feature amount with attribution information of "type" is displayed as plain text.

In addition, as other than above, the display method information can include descriptions such as "position:order" indicating that pieces of interval information which have the same parent with respect to a source code position information and are the same depth are displayed in ascending order, "time:length" indicating that a length for displaying interval information is changed based on feature information having attribute information of "time", or the like.

For example, the description "position:order" indicates that start positions indicating source code position information are sorted and arranges interval information in ascending order based on the sorted start positions. The source code position information includes text information indicating a file of a source code and integer information indicating a line number on the source code. Therefore, for example, it is possible that pieces of interval information for display target are sorted based on the text information, pieces of interval information in the same file are further sorted based on the line numbers, and a result of the sorts is displayed in ascending order.

When the display method information includes the description "time:length", for example, it is possible that when arranging pieces of interval information with the same parent and the same depth, feature information with attribute information of "time" that each interval information has are compared, and the interval information with longer time is drawn as a longer size along an axis corresponding to the interval information while the interval information with shorter time is drawn as a shorter size along the axis.

The program structure information and the display method information obtained by the input unit 101 are inputted into the processing unit 102. The processing unit 102 decides a position for displaying using the program structure information based on the display method information. As a determination method, for instance, it is possible to apply a method in that interval information is arranged on a coordinate system of which vertical axis is depth from an origin interval and horizontal axis is position relationship on the source code, or the like. The origin interval is interval information for setting a range of interval information to be displayed. The origin interval indicates one or more pieces of interval information of which depth from the reference interval are the same. The reference interval indicates interval information which does not have a parent among interval information.

Reference intervals among the pieces of interval information shown in FIGS. 4 to 17 are the pieces of the interval information shown in FIGS. 4 and 5 corresponding to the whole files shown in FIGS. 2 and 3. By referring to these interval information, because the parent information is "none", it can be found that no parent interval exists.

The depth from a reference interval indicates either the number of parents that can be counted by tracking parent intervals from certain interval information to the reference interval or the number of children that can be counted by tracking child intervals from the reference interval to the certain interval information. Here, a case of tracking parent intervals form certain interval information is explained. For example, regarding the interval information shown in FIG. 12, because parent information is "hoge1.c 10-80", it is possible to find that a parent of the interval information shown in FIG. 12 is the interval information shown in FIG. 11. Furthermore, because parent information of the interval information shown in FIG. 11 is "hoge1.c 1-100", it is possible to find that a parent of the interval information shown in FIG. 11 is the interval information shown in FIG. 6. Moreover, because parent information of the interval information shown in FIG. 6 is "hoge1.c 1-300", it is possible to find that a parent of the interval information shown in FIG. 6 is the interval information shown in FIG. 4. Because the interval information shown in FIG. 4 is a reference interval, the number of parents from the interval information shown in FIG. 12 to the reference interval is three of the interval information shown in FIGS. 11, 6, and 4. Therefore, the depth of the interval information shown in FIG. 12 from the reference interval is three. Here, a depth of the interval information being the reference interval shown in FIG. 4 from the reference interval is zero.

A depth from an origin interval is calculated by using an origin interval instead of the reference interval in a calculation of the depth from the reference interval. However, depending on a selection of an origin interval, there may be some interval information which may not reach the origin interval even when parents are traced or interval information which may not reach each interval information even when children are traced. Regarding such interval information, they may be omitted from being display targets as such interval information do not have a depth.

Next, a method for deciding a position of interval information executed by the processing unit 102. In the following, it is assumed that the reference intervals (the interval information of FIGS. 4 and 5) are defined as origin intervals. In the embodiment, because the vertical axis is depth from an origin interval, there is a necessity of calculating depths from the origin regions for every interval information.

By calculating a depth of each interval information using the same processes as the above-described case of calculating the depth (three) of the interval information of FIG. 12, a depth of the interval information of FIG. 4 is zero, a depth of the interval information of FIG. 5 is zero, a depth of the interval information of FIG. 6 is one, a depth of the interval information of FIG. 7 is one, a depth of the interval information of FIG. 8 is one, a depth of the interval information of FIG. 9 is one, a depth of the interval information of FIG. 10 is one, a depth of the interval information of FIG. 11 is two, a depth of the interval information of FIG. 12 is three, a depth of the interval information of FIG. 13 is three, a depth of the interval information of FIG. 14 is two, a depth of the interval information of FIG. 15 is two, a depth of the interval information of FIG. 16 is two, and a depth of the interval information of FIG. 17 is three.

In the embodiment, interval information for display targets (i.e., all of the interval information in this example) is arranged in a direction of the horizontal axis in order of depth. At this stage, interval information with the same depth is arranged at the same position.

Next, parent-child relationships are represented in a direction of the vertical axis. When each interval information is represented as a rectangle region, in order to represent the patent-child relationship, a vertical length of parent interval information is set as equal to or longer than a total length of vertical lengths of all of the child interval information. Furthermore, vertical regions of all the child interval information are arranged so that they fit within a vertical range of the parent interval information. By such arrangement, it is possible to arrange the interval information so that a user can understand a parent-child relationship of the whole source code easily.

Next, feature information is displayed. Because a display method of feature information is described in the display method information (see FIG. 18), in the embodiment, the display method is changed in accordance with the display method information.

In particular, as for the interval information shown in FIGS. 4 to 10, each of which has the feature amount with the attribute information "name", among the interval information, the information of the attribute information "name" is directly displayed in the rectangle region representing the interval information as text. For example, in a case of the interval information shown in FIG. 4, because "name" in the feature information includes information "hoge1.c", "hoge1.c" is displayed in the rectangle region as text information.

Next, as for the interval information shown in FIGS. 11 to 17, each of which does not have the feature among with the attribute information "name", among the interval information, the information of the attribute information "type" is displayed in the rectangle region representing the interval information as text. For example, in a case of the interval information shown in FIG. 11, because "type" in the feature information includes information "condition", "condition" is displayed in the rectangle region as text information. As described above, the display method information can include not only a description of a single display method but also a description for selecting a display method depending on the interval information.

Next, interval information with the same parent and the same depth are arranged in order of start position of source code position information in each interval information. Specifically, firstly, because interval information of which depth is zero, i.e., without a parent, are the interval information of FIGS. 4 and 5, start position of the source codes thereof are compared. However, because both of the interval information of FIGS. 4 and 5 are interval information indicating files, it is impossible to decide an order by comparing the start positions. Therefore, in the embodiment, a result of sorting the feature amounts "hoge1.c" and "hoge2.c" having the attribute information "name" is used. In such case, the interval information (hoge1.c) of FIG. 4 is located on an upper in the direction of the vertical axis, and the interval information (hoge2.c) of FIG. 5 is located on a lower in the direction of the vertical axis. Although it is assumed that the display method is preset, by using like the description "position:order", it is also possible to decide the display method by referring to the display method information.

Interval information with depth "1" are the interval information of FIGS. 6 to 10. Amount these interval information, the interval information of FIG. 4 is a parent of the interval information of FIGS. 6 and 7, and the interval information of FIG. 5 is a parent of the interval information of FIGS. 8, 9, and 10. Therefore, in order to set vertical regions of the children in a vertical range of a parent, according to a position relationship between the interval information of FIGS. 4 and 5, the interval information of FIGS. 6 and 7 are arranged at an upper side in the direction of the vertical axis, and the interval information of FIGS. 8, 9, and 10 are arranged at a lower side in the direction of the vertical axis.

Start positions of the source codes of the children of the interval information of FIG. 4 and start positions of the source codes of the children of the interval information of FIG. 5 are compared separately. As a result, because a start position of the interval information of FIG. 6 is a first line and a start position of the interval information of FIG. 7 is a hundred-and-second line, as for the interval information of FIGS. 6 and 7 to be displayed as the children of the interval information of FIG. 4, the interval information of FIG. 6 is arranged at an upper side in the direction of the vertical axis and the interval information of FIG. 7 is arranged at a lower side in the direction of the vertical axis. Likewise, because a start position of the interval information of FIG. 8 is a first line, a start position of the interval information of FIG. 9 is a hundred-and-sixty-second line, and a start position of the interval information of FIG. 10 is a two-hundred-and-fifty-second line, as for the interval information of FIGS. 8, 9, and 10 to be displayed as the children of the interval information of FIG. 5, the interval information of FIG. 8 is arranged at an upper side in the direction of the vertical axis, the interval information of FIG. 10 is arranged at a lower side in the direction of the vertical axis, and the interval information of FIG. 9 is arranged between the interval information of FIGS. 8 and 10 in the direction of the vertical axis.

Regarding interval information with depth "2" or greater, by the same method, an arrangement order in the direction of the vertical axis is decided.

Next, a vertical length of a rectangle region representing each interval information is changed based on a feature amount with attribute information "time" existing in each interval information. For example, a vertical length of interval information with the same parent and the same depth are changed depending on a ratio of "time". In particular, in the case of the interval information with depth "0" shown in FIGS. 4 and 5, the feature amount of "time" are 1000 and 9000. Therefore, rectangle regions representing the interval information of FIGS. 4 and 5 are set so that a ratio of the vertical lengths becomes 1:9. Although it is assumed that the display method is preset, by using like the description "position:order", it is possible to decide the display method by referring the display method information.

In the case of the interval information with depth "1" shown in FIGS. 6 to 10, firstly, as for the interval information of FIGS. 6 and 7, of which parent is the interval information of FIG. 4, the feature amounts of "time" are referred. The feature amount of "time" of the interval information shown in FIG. 6 is 800, and the feature amount of "time" of the interval information shown in FIG. 7 is 200. As for the interval information of FIGS. 6 and 7, so that a ratio of vertical length of the interval information of FIGS. 6 and 7 becomes 4:1 while vertical regions of the interval information of FIGS. 6 and 7 set in the vertical range of the interval information of FIG. 4, rectangle regions representing the interval information of FIGS. 6 and 7 are set. Likewise, as for the interval information of FIGS. 8, 9 and 10, of which parent is the interval information of FIG. 5, because the feature amounts thereof are 2000, 1000, and 6000, respectively, rectangle regions representing the interval information of FIGS. 8, 9, and 10 are set so that a ratio of vertical length of the interval information of FIGS. 8, 9, and 10 becomes 2:1:6 while vertical regions of the interval information of FIGS. 8, 9, and 10 set in the vertical range of the interval information of FIG. 5.

Furthermore, as for the interval information with depth "2" or greater, vertical lengths are decided by the same method.

After deciding a position and a length of a rectangle region representing each interval information (hereinafter referred to as position information) as described above, the processing unit 102 creates display method information indicating a display method of the program structure information based on the position information. FIG. 19 shows an example of program information displayed by the display unit 103 using display information created by the processing unit 102 according to the embodiment. The display example of the program information shown in FIG. 19 is a display presented with respect to the files shown in FIGS. 2 and 3. Reference numbers in parentheses in FIG. 19 is for specifying corresponding intervals, and they are not information for display.

In the example shown in FIG. 19, rectangle representing the interval information of FIGS. 4 and 5 in a first layer are arranged at the same position in the direction of the horizontal axis and are arranged one above the other in the direction of the vertical axis. Rectangle regions representing the interval information of FIGS. 6 to 10 in the second layer are arranged at the same position in the direction of the horizontal axis. The rectangle regions representing the interval information of FIGS. 6 and 7, of which parent is the interval information of FIG. 4, are arranged one above the other so that they fit within a range of the rectangle region of the interval information of FIG. 4 in the direction of the vertical axis, and the rectangle regions representing the interval information of FIGS. 8, 9, and 10, of which parent is the interval information of FIG. 5, are arranged upside, in the middle and downside so that they fit within a range of the rectangle region of the interval information of FIG. 5 in the direction of the vertical axis. Also, regarding layers from a third layer and beyond, a rectangle region representing each of the interval information is arranged in the same way.

In a rectangle region representing each interval information, feature information of each interval is described as text.

In the example shown in FIG. 19, among feature information, attribute information "name" is described as text. When feature information does not include attribute information "name", attribute information "type" will be described as text.

As described above, the display information includes an instruction for displaying the program information, and these information is inputted from the processing unit 102 to the display unit 103. The display unit 103 provides the program information to a user by displaying the program information on a display, or the like, based on the inputted display information.

As described above, by displaying the program information shown in FIG. 19 in which the pieces of the interval information are arranged hierarchically, a user can understand which execution time of a part in the source code of the files shown in FIGS. 2 and 3 is dominant, a position of the dominant part in the source codes, and so forth, at one view. As a result, the user can specify a necessity of improvement, a part having a necessity of correction, or the like, at one view.

Figure 20:
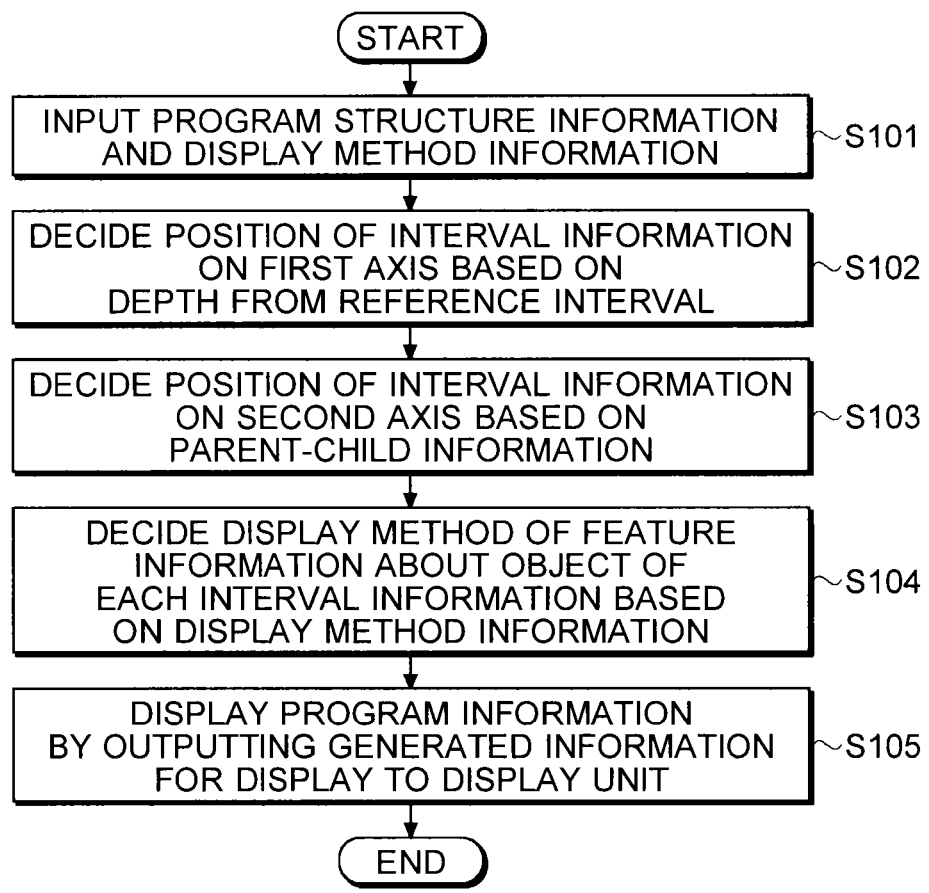
FIG. 20 is a flowchart showing an operation example of the system according to the embodiment.

Next, an outline of an operation of the program information display system will be explained. FIG. 20 is a flowchart showing an operation example of the program information display system. In the program information display system, firstly, the input unit 101 inputs program structure information and display method information (step S101).

Then, the processing unit 102 decides a position of interval information for display target on a first axis (the horizontal axis, for instance) based on a depth from a reference interval (step S102). Then, the processing unit 102 decides a position of the interval information on a second axis (the vertical axis, for instance) based on parent-child information (step S103).

Specifically, by arranging one or more pieces of interval information on a coordinate system of the first axis representing depth from the reference interval and the second axis representing inclusion relationship based on the depth from the reference interval and the parent-child information, regarding the first axis, the processing unit 102 arranges interval information with the same depth from the reference interval at the same positions and in order of depth. Furthermore, regarding the second axis, the processing unit 102 arranges all interval information being children of a parent interval information within a range representing the parent interval information. Or, regarding the second axis, the processing unit 102 arranges all child interval information having the same parent interval information within a range represented by interval information specified as the parent of the child interval information.

Then, the processing unit 102 decides a display method of feature information for an object of each interval information based on the display method information (step S104). Thereby, the display information for realizing the representation shown in FIG. 19 is created.

Then, the display information created by the processing unit 102 is outputted to the display unit 103, and the display unit 103 displays the program information based on the inputted display information (step S105). Then, the program information display system finishes this operation.

As described above, according to the embodiment, with respect to a large program in which massive calls are likely to be occurred, display of the whole information about program execution, simultaneous display of a plurality of pieces of information, integrated display of information with different attributes, display of information with respect to a system with a combination of multiple programming language, display of feature information between hierarchical structures, and so forth, are possible. Thereby, it is possible to provide a user with an environment by which prehension of the whole information about program execution, simultaneous prehension of a plurality of pieces of information, integrative prehension of information with different attributes, prehension of information with respect to a system with a combination of multiple programming language, prehension of feature information between hierarchical structures, and so forth, will become easier.

For example, by executing visualization by mapping the hierarchical structure which uses the inclusion relationship of the source codes on the two axes, it is possible to let a user understand the information about the whole program easily. Furthermore, by displaying the feature information on the mapped image, it is possible to let the user understand the feature of the whole program.

Moreover, by adding the origin interval, it is possible to optionally select interval information. Thereby, zooming-in for referring more detailed information and zooming-out for referring more wide range of information become possible.

Moreover, by adding dynamic information which can be acquired during execution of the source code as the feature information, it is possible to display a combination of the structure information of the source code and the dynamic information.

Moreover, by adding static information which can be acquired from a result of analysis of the source code as the feature information, it is possible to display a combination of the dynamic information and the static information.

Furthermore, by deciding a position on a second axis (the vertical axis, for instance) based on a feature amount, it is possible to decide the position on the second axis based on an arbitrary feature amount uniquely.

Furthermore, by deciding a length along the second axis based on a feature amount, it is possible to decide the length along the second axis based on an arbitrary feature amount uniquely.

FIG. 1 shows a most basic structure in which the functional blocks of the program information display system are connected in order of procedures. However, a structure of the program information display system is not limited to such structure. For example, a structure in that a plurality of functional blocks operates synchronously, a structure where orders of a part of the functional blocks are transposed, a structure in that a certain functional block is divided into the other functional blocks, a combination of these structure, or the like, can be applied. Furthermore, it is also possible to divide each functional block into a plurality of modules.

The input unit 101 may be an input unit such as a simple keyboard, a mouse, or the like, and the input unit 101 may also be a terminal device constructed from a personal computer. The program structure information and the display method information may be inputted by a user directly inputting to the input unit 101, and these information may also be inputted by the input unit 101 acquiring from a storage (not shown) on a network. As described above, it is possible to apply any input method as long as it is possible to transfer necessary information to the processing unit 102.

A target program is not limited to the programs exampled in FIGS. 2 and 3. For example, a program described by a unique programming language for a specific processing device, and a program in binary form compiled by a compiler device of some kind and capable of executing a specific computer device can also be applied. Furthermore, the program may be described in an intermediate representation form for use within such computers, and the program may also be a result of conversion into some form such as an assembly language. Moreover, the program may be an application program executed under an environment such as an operation system of some kind, and the program may be an operation program, a base system, a device driver to execute hard wares, or the like.

As described above, any program can be applied to a target program as long as feature information can be treated in some way and a parent-child relationship equal to that of a source code can be formed. The program is not required to be in a form where the whole information thereof is packed in a single file while the information can be divided into a plurality of files.

Source code position information is not limited to the above-examined information. For example, the information can include path information about a position of a source code, and the information can also include information about a server storing a source code. It is applicable that a successive region in a source code is sandwiched by structures such as blocks in a program language, and the sandwiched region is named, so that the name can be used instead of a line number. Furthermore, it is also applicable that an identifier (ID) is assigned to each successive interval and the ID is used instead of the line number. Moreover, instead of the ID, it is also applicable to assign information of which version is specified using an ID number, or the like, issued on a software management system. As described above, any kind of form can be applied as long as it is possible to identify a region of a target source code.

Parent-child information is not limited to the above-examined information. The parent-child information may include information about only parents or only children, and the parent-child information may also represent a parent-child relationship by an ID assigned for each interval information. When a feature among of interval information includes a unique information by interval information, the parent-child information can use the unique information for representing the parent-child relationship. Or, it is also applicable that a parent-child information is not reserved, and when requested, a parent-child information calculated based on source code position information about all the interval information is used as the parent-child information. Furthermore, it is also applicable that interval information representing the whole application software and information indicating the whole module and straddling files are added, and parent-child relationships are set to each interval information. As described above, any kind of form can be applied as long as it is possible to calculate a depth of each interval information from these information.

Furthermore, feature information is not limited to the above-examined information. For example, the feature information may be information indicating that in an interval indicated by a source code position information, how many time memory accesses are occurred, which memory is accessed, when and how much memory is used, or when a memory is allocated and when the memory is released. Or, the feature information may be an actual value stored in each variable, or the like, at a certain timing during execution of an interval indicated by a source code position information. Or, the feature information may be information indicating which software among software operating the program is operating during execution of an interval indicated by a source code position information. Or, the feature information may be behavior information obtained by hard wares. As described above, any kind of information can be applied as long as information which can be obtained during execution of an interval indicated by a source code position information or information which can be collected by analyzing the interval.

The execution time indicated by the attribute information "time" does not have to be an above-exampled time simply indicating a time for executing an interval indicated by interval information. For example, when a function call, or the like, is executed during an interval of certain interval information, and thereby, the execution is transited to outside of the interval of the interval information, the execution time may not include an execution time about the outside of the interval. Adversely, when the interval includes function call, or the like, for instance, and the called function is included in the interval of the interval information, the execution time can include an execution time for the function. As described above, it is possible to change a method of calculating various feature information using the parent-child relationship of interval information.

Furthermore, display method information is not limited to the above-exampled information. For example, colors filled in areas of graphics objects representing interval information or frame colors of the graphics objects can be changed. Furthermore, shapes of the graphics objects representing interval information can be changed, the graphics objects can be shaded, shined, or visualized stereoscopic display, and a method of filling the graphics objects can be changed. As described above, any kind of display method can be applied as long as it is possible to define differences between intervals indicated by interval information or feature information.

Furthermore, it is possible to assign a plurality of display methods to each feature information. For example, it is possible to change a color filling interval information based on a feature amount while displaying the other feature amount as text.

Regarding a saving format of program structure information, it is not limited to the text format exampled in FIGS. 4 to 17. A format matching the existing database or the other saving format can be used.

Although the source code position information, the parent-child information and the feature information are stored in a single file by each interval information, respectively, in the above-described examples, it is not limited to such manner. For example, all of the information can be stored in a single file, and the information can stored by being divided into further fine units. As described above, any kind of saving format can be applied as long as certain interval information can be read out from the system.

In the above-described examples, although one attribute information includes one information with respect to certain interval information, it is not limited to such manner. For example, one attribute information can includes a plurality of pieces of information. Furthermore, one attribute information can include a plurality of pieces of information acquired based on a version or an input of a source code, a test code, an operation thread, differences of execution environment, or the like. As described above, stored feature information is not limited as long as it is possible to link an interval indicated by source code position information.

Furthermore, although the display method information is treated so that it is recorded in a single file in the above-described examples, it is not limited to such manner. For example, the display method information can be recorded in different files by each feature amount, and the display method information can also be added to each feature information. Furthermore, in the above-described examples, although the method in that a part of the display method is preset and the remaining is stored in the display method information is applied, it is also applicable that all the display method is preset or stored in the display method information. As described above, any kind of saving format can be applied as long as display method information can be read out from the system.

Furthermore, the processing unit 102 can be constructed from a single personal computer or server, and the processing unit 102 can also be constructed from one or more personal computers and/or servers. The processing unit 102 can also be constructed from a dedicated hardware for the system. When the processing unit 102 is constructed from one or more personal computers and/or servers, the processing unit 102 can be a cloud system in which processing modules are dispersedly located on a network.

Furthermore, a method of display program information using a display information is not limited to the above-exampled method. For example, the horizontal axis and the vertical axis in the above-described examples can be interchanged. Furthermore, it is possible to add an axis by using a three-dimensional display. The added axis can be used for representing feature amount or be used as a rotation axis for rotating the displayed coordinate system. As described above, any kind of display method can be applied as long as at least two axes are secured and depth from an origin interval is corresponded to one of the axes.

Furthermore, although depth information from an origin interval is calculated at a time of displaying in the above-described examples, it is also possible to previously calculate depth information and refer the calculated depth information at a time of displaying. Furthermore, although the origin interval is treated as the same with the reference interval in the above-described examples, the origin interval can differ from the reference interval. Moreover, it is also possible that during execution of displaying, initially, the reference interval and the origin interval are set as the same, and based on a user operation with respect to the display result, the origin interval is changed. In such case, it is possible to achieve an effect such as zooming-in/zooming-out of a displayed area.

Furthermore, it is acceptable that interval information for display targets is defined using a depth from the reference interval, and interval information deeper than the defined depth is not displayed. It is also acceptable that interval information with a depth specified using information of some kind and specific interval information are not displayed. When a part of interval information with depths till a certain depth is omitted from displaying, if interval information with intermediate depth is deleted without deleting deepest interval information, a part of a correspondence relationship between a depth and the second axis may be broken. However, if the correspondence relationship till a certain depth is maintained, the relationship can be permitted. Adversely, it is also acceptable that interval information including interval information with the certain depth or included in the other interval information with the certain depth is created and additionally displayed. In this way, it is possible to control a particle size of displayed information, and thereby, it is possible to compress information appropriately.

Furthermore, in the example shown in FIG. 19, although the whole vertical length of the parent interval information is used for the total vertical length of the child interval information, the total vertical length of the child interval information can be less than the whole vertical length of the parent interval information. Furthermore, although the horizontal lengths of the interval information are constant, a horizontal length becoming shorter depending on a depth, a horizontal length becoming longer depending on a depth, or a horizontal length without dependence on a depth can be applied.

Furthermore, a length about a feature amount can be independent from a ratio of values of feature amounts. For example, the length about a feature amount can depend on an inverse of the ratio of values of feature amount, or can depend on a value decided by adding or subtracting a specific value or by multiplying or dividing by a specific value. As described above, the lengths of the graphics objects and the display method can be changed as long as one axis represents depths from a reference interval and the other axis represents a parent-child relationship in a finally-displayed image.

Furthermore, in the above-described examples, although each interval information is represented by a rectangular block, it is possible to use another graphics object. For example, a square, a rhombic, a triangle, a circle, or the like, a combination thereof can be used as the graphics object. In such case, as the case of using the rectangular blocks, lengths of two side of each graphics object should be linked with the two axes, respectively.

Furthermore, in the above-described examples, although values included in the feature information are directly used for displaying, it is not limited to such manner. A result of analysis, conversion, or the like, using the values in feature amounts included in the feature information can be used for displaying.

Figure 21:
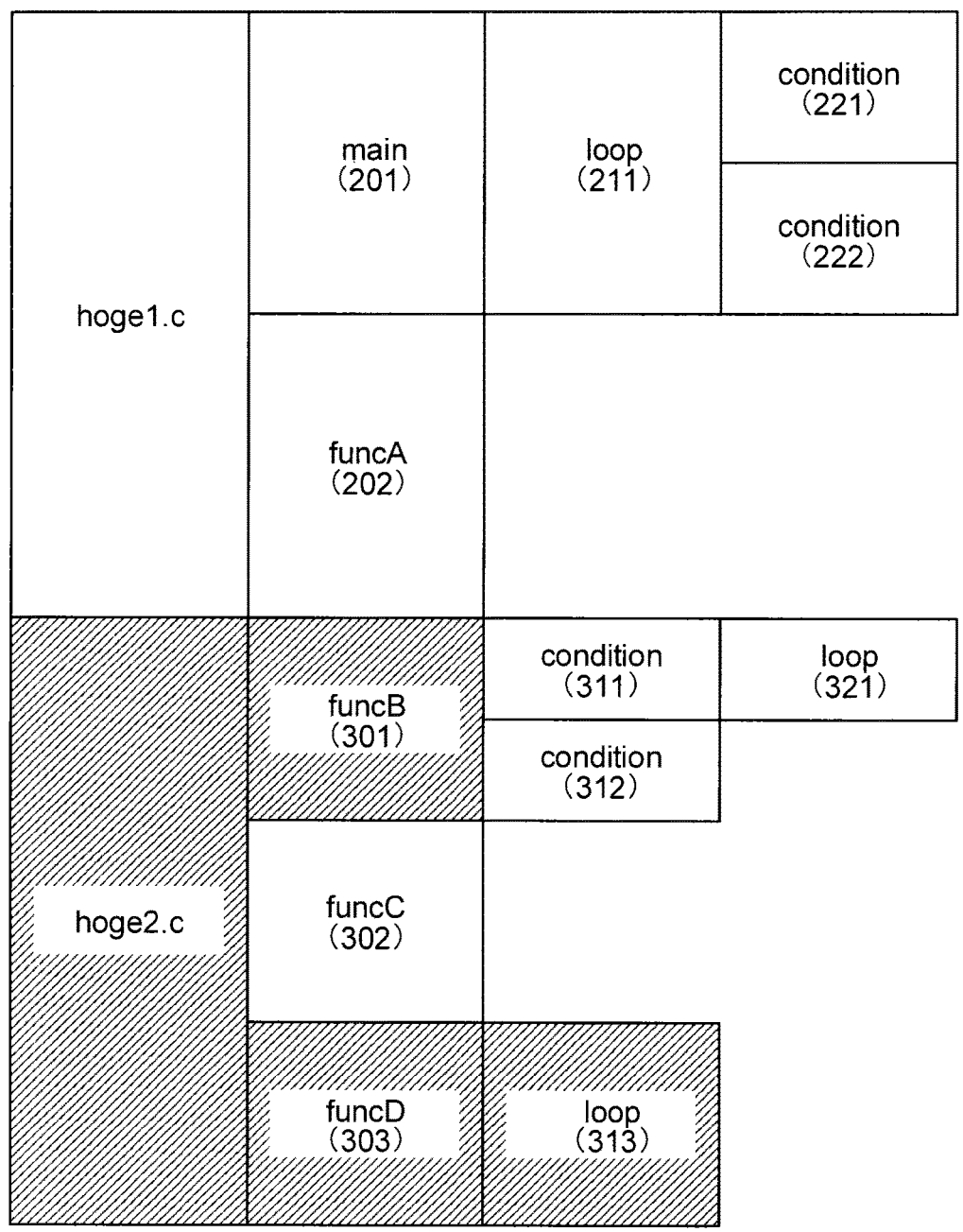
FIG. 21 is an illustration showing another example of the display method according to the embodiment.

FIG. 21 shows another display example of program information. In the display example of program information shown in FIG. 21, with respect to the interval information shown in FIGS. 4 and 5 in the first layer, the vertical axis is divided evenly, and with respect to interval information in the second layer and beyond, a vertical length of a parent interval information is divided evenly by the number of child interval information.

In the example shown in FIG. 21, depending on a feature amount with attribute information "time", a color (including a background color and a font color) and a shape (including frame shape) of an object (rectangle) representing each interval information are changed. In the examples shown in FIGS. 2 to 17, whereas the whole execution time is 10000, the execution times of the interval information 200, 211, 213, and 223 are equal to or greater than 2000, respectively. Therefore, as shown in FIG. 21, with respect to the interval information shown in FIGS. 5, 8, 10, and 16 each of which execution time is equal to or greater than a specific ratio (here, two out of ten) of the whole execution time, graphics objects representing them can be mapped with colors different from colors of the other interval information.

Figure 22:
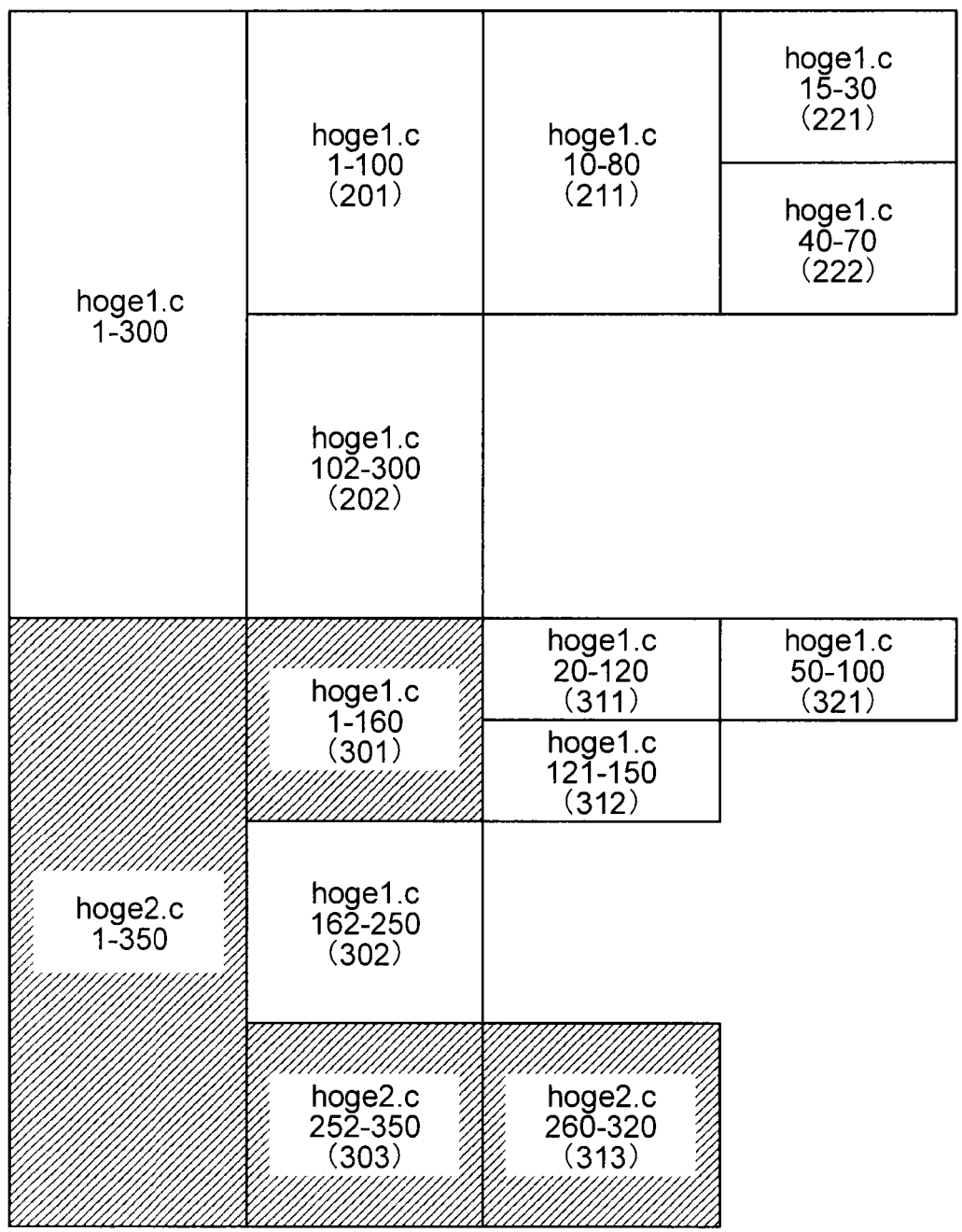
FIG. 22 is an illustration showing yet another example of the display method according to the embodiment.

FIG. 22 shows yet another display example of program information. The display example of program information shown in FIG. 22 has the same configuration with the display example shown in FIG. 21, and in the graphics object (rectangle) representing each interval information, instead of feature information (in FIG. 21, attribute information "name" or "type"), source code position information is described. As described above, information described in the graphics object (rectangle) representing each interval information is not limited to feature information, and various kind of information which can be useful for a user among information included in interval information can be described in the graphics objects.

Furthermore, the display unit 103 may be a single display or a terminal device constructed from a personal computer, or the like, having a display.

In the above description, although a case where understanding of the whole information about program execution and simultaneous displaying of a plurality of pieces of information become possible when a software is intended is explained, effects according to the above-described embodiment are not limited to such case, and the effects can be achieved in the other case.

For example, with respect to information display in a system constructed by multiple programming languages, the above-described embodiment can be applied. Between an object-oriented language and a procedural language, program structures are different in presence or absence of a concept of class, and so forth. Due to these differences, there is a necessity of buffering the differences in respect of whether information about class is displayed at a time of displaying a call relationship, whether information about method is displayed, or the like. Furthermore, because a new program structure such as a functional language, an aspect-oriented language, or the like, comes up, there is a necessity of modifying the existing method in conformity to a use language. In contrast, in the above-described embodiment, because of focusing a hierarchic structure on a source code and using a parent-child relationship of interval information for displaying the hierarchic structure, even if a program structure is different, it is possible to visualize the structure by an inclusion relation on the source code. Therefore, it is possible to apply the embodiment without modifying depending on a program structure.

Furthermore, the above-described embodiment can be applied to a case of information display using a plurality of data. In the prior art, at least one screen should be provided for each information. Therefore, when a plurality of pieces of information are displayed, screens should be created for every information. In contrast, in the above-described embodiment, because it is possible to change a display method for a plurality of pieces of information depending on a time of acquired information, an acquired user, an acquired environment, or the like, and bundle the same attribute information across information, it is possible to display the whole information on a single screen.

Furthermore, the above-described embodiment is effective for understanding feature information between hierarchic structures. In the prior art, when focusing an execution time, for instance, each value or whole feature such as an average value should be displayed. Therefore, when an execution time of a certain function is large, it is impossible to understand a difference between a case where an execution time of a specific child interval enlarges the execution time of the certain function and a case where a total execution time is seemed large because the line number is large although an execution time of each child interval is not large. In contrast, in the above-described embodiment, because displaying a feature amount of an execution time between layers, it is possible to understand such difference from a single screen.

While a certain embodiment has been described, this embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A program information display system capable of displaying program information based on program structure information, the system comprising:
   an input device configured to input the program structure information;
   a processing device configured to create display information for visualizing the program information from the program structure information; and
   a display device configured to display the program information, wherein
   the program structure information includes one or more pieces of interval information,
   the one or more pieces of interval information include first information and second information,
   the first information is information indicating a successive region on a source code of a target program,
   the second information is information for specifying the other interval information having an inclusive relationship with interval information including own interval information,
   the second information included in first interval information includes third information indicating whether second interval information exists or whether third interval information exists,
   a successive region indicated by the first information included in the first interval information includes a successive region indicated by first information included in the second interval information,
   the successive region indicated by the first information included in the first interval information is included in a successive region indicated by first information included in the third interval information,
   when at least one of the second and third interval information exists, the second information includes at least one of fourth information for specifying the second interval information and fifth information for specifying the third interval information,
   the fourth information does not include fourth interval information including a successive region indicated by the first information included in a successive region indicated by the first information included in the second interval information,
   the fifth information does not include fifth interval information including a successive region indicated by the first information including a successive region indicated by the first information included in the third interval information,
   the program structure information includes at least one piece of interval information including a successive region indicated by the first information not included in any of all interval information,
   interval information including the successive region indicated by the first information not included in any of all interval information is defined as a reference interval,
   the processing device specifies the number of pieces of interval information counted during tracing the fourth information included in each interval information from the reference interval to each interval information or the number of pieces of interval information counted during tracing the fifth information included in each interval information from each interval information to the reference interval as a depth of each interval information from the reference interval,
   interval information with the same depth do not have an inclusive relationship with each other, the processing device creates, by arranging the one or more interval information on a coordinate system defined by a first axis representing a depth from the reference interval and a second axis representing the inclusive relationship based on a depth from the reference interval and the second information, the display information in which, with respect to the first axis, pieces of interval information with the same depth from the reference interval are arranged on the same position on the first axis in order of depth, and with respect to the second axis, objects representing pieces of interval information specified by all fourth information included in the first interval information are arranged within a range of an object representing the first interval information or the object representing the first interval information is arranged within a range of an object representing interval information specified by the fifth information included in the first interval information, the each interval information includes first feature information indicating an internal state capable of being acquired at a specific timing during execution of a source code in an interval indicated by the first information, the first feature information includes a first feature amount indicating a content of a feature amount and first attribute information indicating an attribute of the feature amount, a second axial length of the object representing to the first interval information is changed based on the feature amount indicating an execution time in the first interval information, the second axial length being a length in direction of the second axis, and the display device displays the program information based on the created display information.

2. The system according to claim 1, wherein
the program structure information includes at least one origin interval selected from among pieces of interval information of which depths from the reference interval are the same, and the processing device specifies the number of pieces of interval information counted during tracing the fourth information from the origin interval to each interval information or the number of pieces of interval information counted during tracing the fifth information from each interval information to the origin interval as a depth of each interval information from the origin interval, and with respect to interval information not through by the tracing of the fourth information from the origin interval or interval information not reached to the origin interval by the tracing of the fifth information, defines as interval information without depth from the origin interval, and does not arrange on the coordinate system.

3. The system according to claim 1, wherein
the input device inputs first display method information to be used for displaying the first feature amount corresponding to the first attribute information, the processing device creates the display information based on the first feature amount and the first display method information.

4. The system according to claim 3, wherein
each interval information includes second feature information indicating a feature of a source code in an interval indicated by the first information, the second feature information includes a second feature amount indicating a content of a feature amount and second attribute information indicating an attribute of the feature amount, the display method information includes second display method information used for displaying the second feature amount corresponding to the second attribute information, and the processing device adds the second feature amount and a display method thereof in the display information based on the second display method information.

5. The system according to claim 4, wherein
each interval information includes a third feature amount indicating a content of a feature and third attribute information indicating an attribute of the feature amount, the display method information includes third display method information for deciding, based on the third feature amount corresponding to the third attribute information, positions on the second axis with respect to all interval information specified by the fourth information for the same interval information or all interval information having the same fifth information to interval information specified by the same fifth information, and the processing device decides the positions on the second axis with respect to the all interval information specified by the fourth information for the same interval information or the all interval information having the same fifth information to interval information specified by the same fifth information based on the third display method information.

6. The system according to claim 5, wherein
each interval information includes a fourth feature amount indicating a content of a feature amount and fourth attribute information indicating an attribute of the feature amount, the display method information includes fourth display method information for deciding a length of each interval information along the second axis based on the fourth feature amount corresponding to the fourth attribute information, and the processing device decides the length of each interval information along the second axis from the fourth feature information based on the fourth display method information.

7. The system according to claim 4, wherein
each interval information includes a fourth feature amount indicating a content of a feature amount and fourth attribute information indicating an attribute of the feature amount, the display method information includes fourth display method information for deciding a length of each interval information along the second axis based on the fourth feature amount corresponding to the fourth attribute information, and the processing device decides the length of each interval information along the second axis from the fourth feature information based on the fourth display method information.

8. The system according to claim 1, wherein
each interval information includes first feature information indicating an internal state capable of being acquired at a specific timing during execution of a source code in an interval indicated by the first information, the first feature information includes a first feature amount indicating a content of a feature amount and first attribute information indicating an attribute of the feature amount, and
the processing device creates the display information based on the first feature amount.

9. The system according to claim 8, wherein
the input device inputs first display method information to be used for displaying the first feature amount corresponding to the first attribute information,
the processing device creates the display information based on the first feature amount and the first display method information.

10. The system according to claim 9, wherein
each interval information includes second feature information indicating a feature of a source code in an interval indicated by the first information,
the second feature information includes a second feature amount indicating a content of a feature amount and second attribute information indicating an attribute of the feature amount,
the display method information includes second display method information used for displaying the second feature amount corresponding to the second attribute information, and
the processing device adds the second feature amount and a display method thereof in the display information based on the second display method information.

11. The system according to claim 10, wherein
each interval information includes a third feature amount indicating a content of a feature and third attribute information indicating an attribute of the feature amount,
the display method information includes third display method information for deciding, based on the third feature amount corresponding to the third attribute information, positions on the second axis with respect to all interval information specified by the fourth information for the same interval information or all interval information having the same fifth information to interval information specified by the same fifth information, and
the processing device decides the positions on the second axis with respect to the all interval information specified by the fourth information for the same interval information or the all interval information having the same fifth information to interval information specified by the same fifth information based on the third display method information.

12. The system according to claim 11, wherein
each interval information includes a fourth feature amount indicating a content of a feature amount and fourth attribute information indicating an attribute of the feature amount,
the display method information includes fourth display method information for deciding a length of each interval information along the second axis based on the fourth feature amount corresponding to the fourth attribute information, and
the processing device decides the length of each interval information along the second axis from the fourth feature information based on the fourth display method information.

13. The system according to claim 10, wherein
each interval information includes a fourth feature amount indicating a content of a feature amount and fourth attribute information indicating an attribute of the feature amount,
the display method information includes fourth display method information for deciding a length of each interval information along the second axis based on the fourth feature amount corresponding to the fourth attribute information, and
the processing device decides the length of each interval information along the second axis from the fourth feature information based on the fourth display method information.

14. The system according to claim 1, wherein
the first feature information is described as text in the object representing the first interval information.

15. A method of displaying program information which is executed on a system having an input device configured to input program structure information, a processing device configured to create display information for visualizing the program information from the program structure information, and a display device configured to display the program information, wherein
the program structure information includes one or more pieces of interval information,
the one or more pieces of interval information include first information and second information,
the first information is information indicating a successive region on a source code of a target program,
the second information is information for specifying the other interval information having an inclusive relationship with interval information including own interval information,
the second information included in first interval information includes third information indicating whether second interval information exists or whether third interval information exists,
a successive region indicated by the first information included in the first interval information includes a successive region indicated by first information included in the second interval information,
the successive region indicated by the first information included in the first interval information is included in a successive region indicated by first information included in the third interval information,
when at least one of the second and third interval information exists, the second information includes at least one of fourth information for specifying the second interval information and fifth information for specifying the third interval information,
the fourth information does not include fourth interval information including a successive region indicated by the first information included in a successive region indicated by the first information included in the second interval information,
the fifth information does not include fifth interval information including a successive region indicated by the first information including a successive region indicated by the first information included in the third interval information,
the program structure information includes at least one piece of interval information including a successive region indicated by the first information not included in any of all interval information, and interval information including the successive region indicated by the first information not included in any of all interval information is defined as a reference interval, the method comprising:

specifying, by the processing device, the number of pieces of interval information counted during tracing the fourth information included in each interval information from the reference interval to each interval information or the number of pieces of interval information counted during tracing the fifth information included in each interval information from each interval information to the reference interval as a depth of each interval information from the reference interval, the interval information with the same depth not having an inclusive relationship with each other, creating, by the processing device, by arranging the one or more interval information on a coordinate system defined by a first axis representing a depth from the reference interval and a second axis representing the inclusive relationship based on a depth from the reference interval and the second information, the display information in which, with respect to the first axis, pieces of interval information with the same depth from the reference interval are arranged on the same position on the first axis in order of depth, and with respect to the second axis, objects representing pieces of interval information specified by all fourth information included in the first interval information are arranged within a range of an object representing the first interval information or the object representing the first interval information is arranged within a range of an object representing interval information specified by the fifth information included in the first interval information, and displaying, by the display device, the program information based on the created display information, wherein the each interval information includes first feature information indicating an internal state capable of being acquired at a specific timing during execution of a source code in an interval indicated by the first information, the first feature information includes a first feature amount indicating a content of a feature amount and first attribute information indicating an attribute of the feature amount, and a second axial length of the object representing to the first interval information is changed based on the feature amount indicating an execution time in the first interval information, the second axial length being a length in direction of the second axis.

16. A non-transitory computer-readable program product storing instructions for letting a computer processor execute a process of creating display information for visualizing program information obtained by analyzing program structure information, wherein the program structure information includes one or more pieces of interval information, the one or more pieces of interval information include first information and second information, the first information is information indicating a successive region on a source code of a target program, the second information is information for specifying the other interval information having an inclusive relationship with interval information including own interval information, the second information included in first interval information includes third information indicating whether second interval information exists or whether third interval information exists, a successive region indicated by the first information included in the first interval information includes a successive region indicated by first information included in the second interval information, the successive region indicated by the first information included in the first interval information is included in a successive region indicated by first information included in the third interval information, when at least one of the second and third interval information exists, the second information includes at least one of fourth information for specifying the second interval information and fifth information for specifying the third interval information, the fourth information does not include fourth interval information including a successive region indicated by the first information included in a successive region indicated by the first information included in the second interval information, the fifth information does not include fifth interval information including a successive region indicated by the first information including a successive region indicated by the first information included in the third interval information, the program structure information includes at least one piece of interval information including a successive region indicated by the first information not included in any of all interval information, and interval information including the successive region indicated by the first information not included in any of all interval information is defined as a reference interval, the instructions comprising:

specifying the number of pieces of interval information counted during tracing the fourth information included in each interval information from the reference interval to each interval information or the number of pieces of interval information counted during tracing the fifth information included in each interval information from each interval information to the reference interval as a depth of each interval information from the reference interval, the interval information with the same depth do not have an inclusive relationship with each other, and creating, by arranging the one or more interval information on a coordinate system defined by a first axis representing a depth from the reference interval and a second axis representing the inclusive relationship based on a depth from the reference interval and the second information, the display information in which, with respect to the first axis, pieces of interval information with the same depth from the reference interval are arranged on the same position on the first axis in order of depth, and with respect to the second axis, objects representing pieces of interval information specified by all fourth information included in the first interval information are arranged within a range representing the first interval information or the object representing the first interval information is arranged within a range of an object representing interval information specified by the fifth information included in the first interval information, wherein the each interval information includes first feature information indicating an internal state capable of being acquired at a specific timing during execution of a source code in an interval indicated by the first information, the first feature information includes a first feature amount indicating a content of a feature amount and first attribute information indicating an attribute of the feature amount, and a second axial length of the object representing to the first interval information is changed based on the feature amount indicating an execution time in the first interval information, the second axial length being a length in direction of the second axis.

17. A program information display system capable of displaying program information based on program structure information, the system comprising:

an input device configured to input the program structure information;

a processing device configured to create display information for visualizing the program information from the program structure information; and a display device configured to display the program information, wherein the program structure information includes one or more pieces of interval information, the interval information includes information indicating successive interval on a source code of a target program, information indicating an inclusive relationship among the plurality of the successive intervals, information indicating a feature amount indicating an internal state capable of being acquired at a specific timing during execution of the successive interval, and information indicating a reference interval that is the successive interval not included in the any other successive intervals, a processing device specifies a depth of the successive interval from the reference interval based on the interval information, the successive intervals with the same depth do not have the inclusive relationship with each other, the processing device creates the display information for displaying an image in which one or more objects representing each of the successive intervals on a coordinate system defined by a first axis representing the depth and a second axis representing the inclusive relationship, the plurality of the objects corresponding to the successive intervals with the same depth are arranged on the same position on the first axis, the object corresponding to a child interval that is the successive interval included in a parent interval is arranged in a range of a second axial length of the object corresponding to the parent interval that is the successive interval including the child interval, the second axial length being a length in direction of the second axis, the second axial length of the object is changed based on the feature amount indicating an execution time of the successive interval, and the display device displays the program information based on the created display information.

* * * * *